United States Patent

Tsukamoto

[11] Patent Number: 5,313,400
[45] Date of Patent: May 17, 1994

[54] TRACING METHOD

[75] Inventor: Osamu Tsukamoto, Minamitsuru, Japan

[73] Assignee: Fanuc Ltd., Minamitsuru, Japan

[21] Appl. No.: 103,153

[22] Filed: Aug. 9, 1993

Related U.S. Application Data

[63] Continuation of Ser. No. 573,128, filed as PCT/JP90/00117, Jan. 31, 1990, abandoned.

[30] Foreign Application Priority Data

Feb. 14, 1989 [JP] Japan ................................. 1-34862

[51] Int. Cl.⁵ .............................................. G06F 15/46
[52] U.S. Cl. ............................ 364/474.03; 364/474.28
[58] Field of Search ...................... 364/474.03, 474.05, 364/474.28–474.36, 474.37

[56] References Cited

U.S. PATENT DOCUMENTS 4,456,864  6/1984  Imazeki et al. ...................... 318/578
4,456,962  6/1984  Imazeki et al. ...................... 364/520

FOREIGN PATENT DOCUMENTS 08449    9/1983  European Pat. Off. .
0168501  1/1986  European Pat. Off. .
2020852  11/1979 United Kingdom .

Primary Examiner—Jerry Smith
Assistant Examiner—Jim Trammell
Attorney, Agent, or Firm—Staas & Halsey

[57] ABSTRACT

A tracing operation by designating a region is performed after a wire limit. Tracing line segments (2a, 2b, 2c) parallel to the wire limit (1) are found connecting a plurality of points. The tracing operation is performed by moving a stylus on a path along the tracing line segments (2a, 2b, 2c), whereby a tracing region determined by a complex wire limit can be accurately traced.

1 Claim, 3 Drawing Sheets

TRACING METHOD

This application is a continuation of application Ser. No. 07/573,128, filed as PCT/JP90/00117, Jan. 31, 1990, now abandoned.

BACKGROUND OF THE INVENTION

1. Field of the Invention

The present invention relates to a tracing method by which tracing is carried out by designating a region by a wire limit, and more specifically, to a method by which a tracing direction can be arbitrarily changed in a single path.

2. Description of the Related Art

A method of tracing a model configuration by designating a region by a wire limit includes, for example, a method shown in FIG. 3(a). As shown in the figure, tracing is carried out along a path 12a in a tracing direction parallel to the X-axis, from a tracing start point Ps1, and when a stylus comes into contact with a wire limit 1, the stylus senses the line, a predetermined amount of a pick feed 13a is effected from the point P1 to a point Pa1, and the tracing is again carried out along a path 12b which is parallel to the X-axis and extends in a direction opposite to that of the path 12a. Thereafter, a not shown model configuration is traced by sequentially executing a pick feed 13b, path 12c, pick feed 13c.... Note that a tracing direction of the above respective paths may be set at a predetermined angle to the X-axis direction or the paths may be traced in the Y-axis direction.

Nevertheless, according to this method, the start point Pa1 of the path 12b is positioned inward of the wire limit 1, whereas the start point Pa3 of the path 12d is positioned outward of the wire limit 1. Therefore, tracing cannot be accurately carried out within a region enclosed by the wire limit 1, and thus the tracing accuracy is poor.

As a method of solving this problem, the method shown in FIG. 3 (b) can be used, in which tracing is carried out from the start point Ps1 to a point Pb1 along a path 22a traveling in a direction that is at an angle θ1 with respect to the X-axis, whereby the tracing is carried out in parallel to the line segment P1-P2 of the wire limit 1. Thereafter, the tracing is carried out from the point Pb1 to a point Pb2 along a path 22b traveling in a direction that is at an angle θ2 with respect to the X-axis, whereby the tracing is carried out in parallel to the line segment P2-P3 of the wire limit 1. Subsequently, the tracing is carried out in a similar way by combining paths traveling in different directions.

When, however, the configuration of the wire limit 1 is complex, the number of paths is greatly increased, which requires a complex program and increases the tracing time.

SUMMARY OF THE INVENTION

Taking the above into consideration, an object of the present invention is to provide a tracing method by which a tracing direction can be arbitrarily changed in a single path.

To solve the above problem, in accordance with the present invention, there is provided a tracing method for carrying out tracing by designating a region by a wire limit, which comprises the steps of determining tracing line segments parallel to the wire limit composed of limit line segments connecting a plurality of points and carrying out the tracing by moving a stylus on a single path along the tracing line segments.

The tracing line segments parallel to the wire limit are determined at a start point of the tracing and the stylus is moved on the single path along the tracing line segments.

DESCRIPTION OF THE PREFERRED EMBODIMENT

An embodiment of the present invention will be described below with reference to the drawings.

Figure 1:
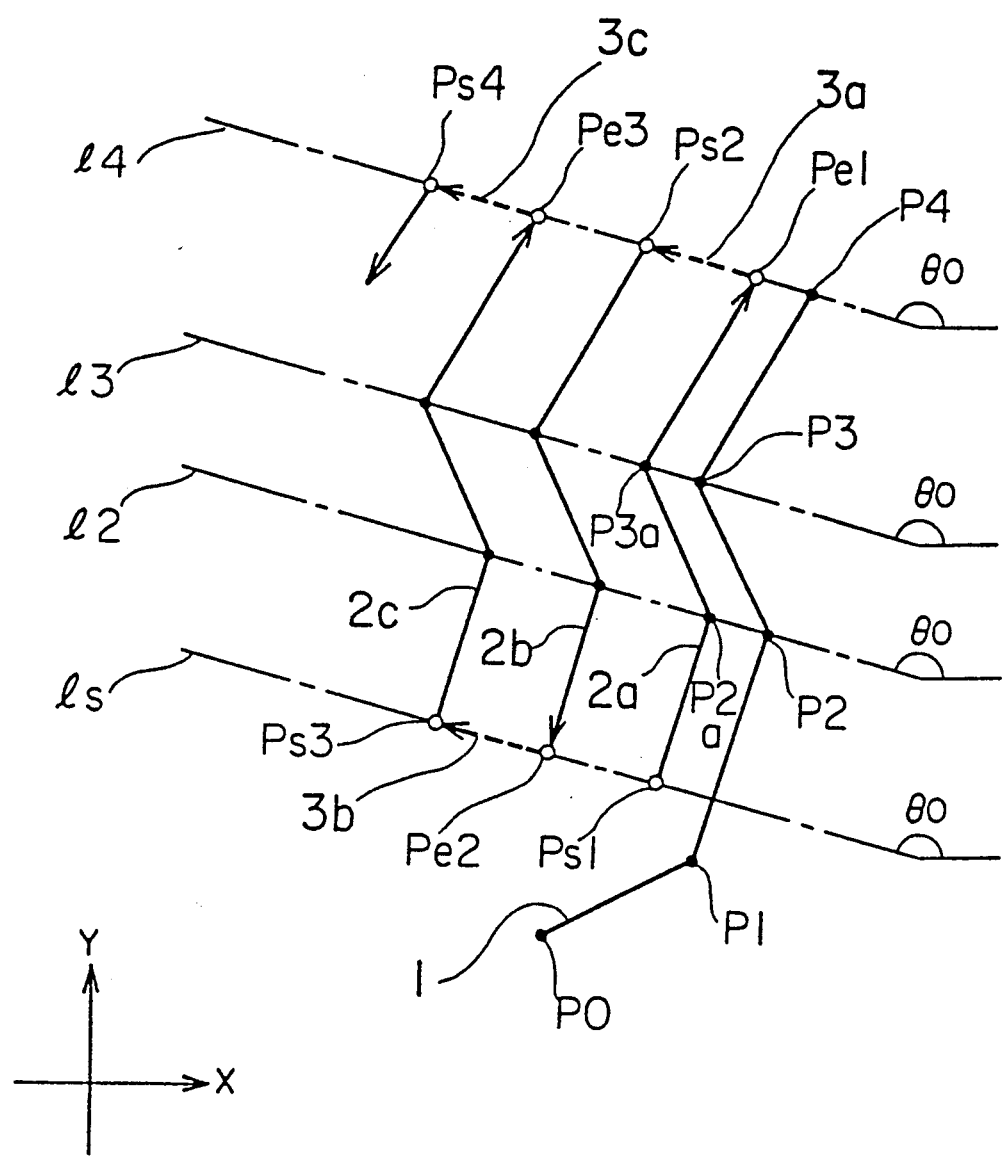
FIG. 1 is a conceptual diagram of a tracing method according to the present invention.

FIG. 1 is a conceptual diagram of a tracing method according to the embodiment of the present invention, wherein a wire limit 1 is a software, wire limit and set on a coordinate sequentially connecting limit points P0, P1 ... P4 input by an operator.

Here, how to determine the path 2a along which a stylus travels will be described.

First, a point nearest to a tracing start point Ps1 is determined from the limit points 2a P0, P1 ... P4. Here the point P1 corresponds to the point to be determined and a straight line is extended from a start point Ps1 to a point P2a in parallel to the limit line segment P1-P2 connecting the point P1 and the next point P2. The point P2a is the point at which the straight line extended from the start point Ps1 intersects a straight line 1 2 extended from the point P2 at a pick feed angle of θ0. Note that the pick feed angle θ0 is arbitrarily set by the operator.

Similarly, a straight line is extended from the point P2a to the point P3a at which it intersects a straight line 13 in parallel to the limit line segment P2-P3, and further extended from the point P3a to the point Pe1 at which it intersects a straight line 14 in parallel to the line segment P3-P4 to determine the tracing line segments Ps1-P2a-P3a-Pe1. A stylus is moved from the point Ps1 to the point Pe1 along the traveling channel of the path 2a represented by the tracing line segments, to carry out the tracing, and a predetermined amount of a pick feed 3a is carried out from the point Pe1 to the point Ps2 at a pick feed angle of θ0.

Next, the tracing is carried out by moving the stylus from the point Ps2 to a point Pe2 along a path 2b as a traveling channel parallel to the wire limit, which has been determined by the same method as that used to determine the traveling channel of the path 2a. The point Pe2 is the point at which the traveling channel of the path 2b intersects a straight line ls extended from the start point Ps1 at the pick feed angle of θ0.

A pick feed 3b is again carried out to the point Ps3, and thereafter, the tracing and pick feed are repeated in the same way in the sequence of a path 2c, pick feed 3c, ..., and finally, the movement of the stylus is stopped to complete the tracing when the total of the pick feeds 3a, 3b, ..., has reached a preset total amount of the pick feeds.

Figure 2:
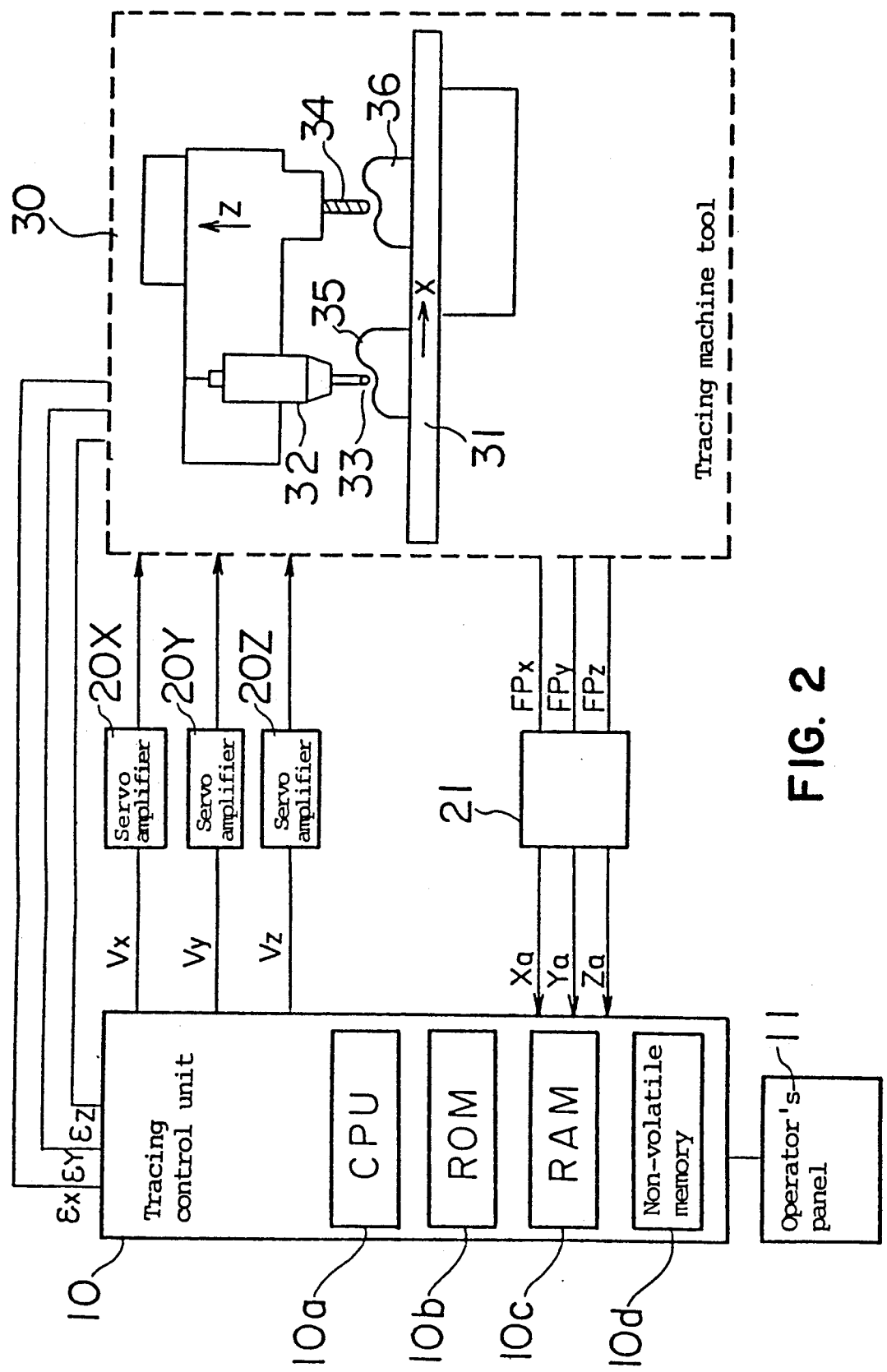
FIG. 2 is a block diagram showing a hardware arrangement embodying the tracing method according to the present invention.
Figure 3A:
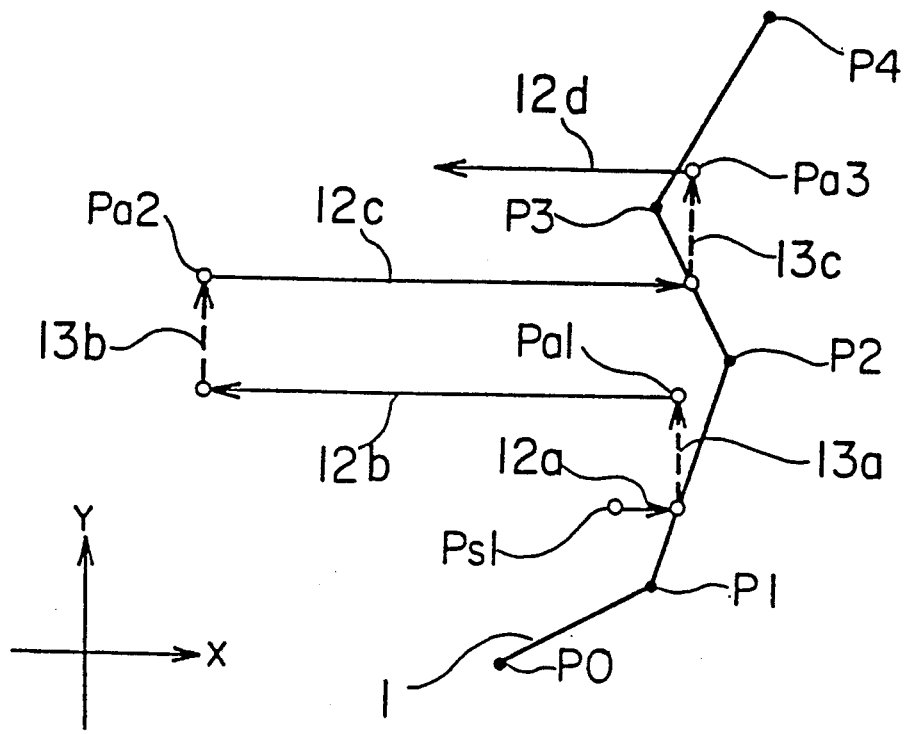
FIG. 3(a) is a conceptual diagram of a conventional tracing method.
Figure 3B:
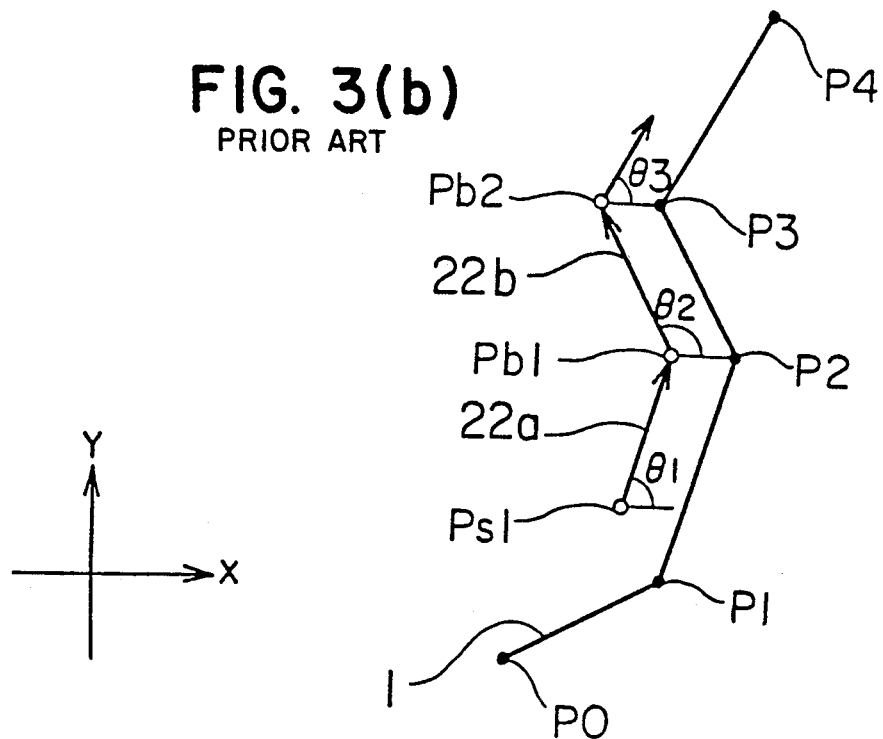
FIG. 3(b) is a conceptual diagram of another conventional tracing method.

FIG. 2 is a block diagram showing a hardware arrangement embodying the tracing method according to the present invention. A tracing control unit 10 includes a processor 10a, a ROM 10b in which a control program is stored, a RAM 10c, and a non-volatile memory 10d. The tracing control unit 10 is provided with amounts of deflection $\epsilon x$, $\epsilon y$, and $\epsilon z$ of the respective axes of a machine tool 30 input thereto and outputs speed commands Vx, Vy, and Vz. Further, various data such as coordinate values for setting the wire limit, pick feed angles, a total amount of pick feeds, and the like are input to the tracing control unit 10 through an operator's panel by the operator, to thereby calculate the traveling channels of the paths.

Servo amplifiers 20X, 20Y, and 20Z amplify the speed commands Vx, Vy, and Vz from the tracing control unit 10 and drive the motors of the respective axes of the machine tool 30, to be described later. A position memory 21 counts up or down detection pulses FPx, FPy, and FPz in accordance with a rotational direction, to monitor the present positions Xa, Ya, and Za in the directions of the respective axes; the pulses being generated each time the motors of the respective axes are rotated a predetermined amount of rotation.

Although not shown, the tracing machine tool 30 is provided with an X-axis motor and a Y-axis motor for driving a table 31 in the X-axis and Y-axis directions, respectively, a Z-axis motor for driving a tracer head 32 and a cutter head 34 in the Z-axis direction, and a pulse generator for generating the detection pulses FPx, FPy, and FPz each time the motors of the respective axes are rotated by a predetermined amount.

A model 35 and a workpiece 36 are fixed to the table 31, the stylus 33 mounted on the tracer head 32 is brought into contact with the surface of the model 35 to carry out a predetermined tracing, and the cutter head 34 machines the workpiece 36 to a configuration similar to that of the model 35. As is well known, the tracer head 32 detects the amounts of deflection $\epsilon x$, $\epsilon y$, and $\epsilon z$ on the surface of the model 35 along the X-, Y- and Z-axes.

As described above, according to the present invention, since the tracing line segments parallel to the wire limit at the tracing start point is determined and the stylus is moved along a single path, any arbitrary region can be easily traced in a short time.

Further, because the tracing is carried out in parallel to the wire limit, the end of the workpiece can be smoothly cut in conformity with the configuration of the model.

What is claimed is:

1. A method of carrying out a tracing operation in a region designated by a wire limit defined by limit line segments connecting a plurality of limit points, comprising the steps of:
    (a) determining a first limit point, nearest to a first tracing point, from among the limit points;
    (b) setting a pick feed angle relative to a first coordinate axis;
    (c) determining a second tracing point lying on a straight line passing through a second limit point adjacent the first limit point and forming the pick feed angle with the first coordinate axis, so that a first tracing line segment connecting the first and second tracing points is parallel to a first limit line segment connecting the first and second limit points;
    (d) tracing a stylus in a first tracing direction along the first tracing line segment;
    (e) repeating steps (c) and (d) until the stylus reaches an end point of a first tracing path;
    (f) performing a pick feed to move the stylus a predetermined distance in a pick feed direction along a first pick feed line forming the pick feed angle with the first coordinate axis, to position the stylus at a new tracing start point;
    (g) repeating steps (c)–(f) to trace the stylus along a second tracing path in a second direction opposite to the first direction until an end point of the second tracing path is reached and the pick feed is performed in the pick feed direction along a second pick feed line parallel to the first pick feed line; and
    (h) repeating steps (c)–(g) alternating the first and second tracing direction and the pick feed along the first and second pick feed lines.

* * * * *

UNITED STATES PATENT AND TRADEMARK OFFICE
CERTIFICATE OF CORRECTION

PATENT NO. : 5,313,400
DATED : May 17, 1994
INVENTOR(S) : Osamu Tsukamoto

It is certified that error appears in the above-indentified patent and that said Letters Patent is hereby corrected as shown below:

Title Page, [57] Abstract, line 1, delete "by" and substitute --is performed after--;

lines 1 and 2, delete "is performed after" and substitute --by--; and line 3, after "(1)" insert --#--.

Col. 2, line 31, delete "2a";

line 38, delete "12" and substitute --$\ell 2$--;

line 44, delete "13" and substitute --$\ell 3$--;

line 46, delete "14" and substitute --$\ell 4$--; and line 60, delete "1s" and substitute --$\ell s$--.

Signed and Sealed this

Thirteenth Day of September, 1994

Attest:

BRUCE LEHMAN

Attesting Officer      Commissioner of Patents and Trademarks